US008448970B1

(12) United States Patent
Vardon

(10) Patent No.: US 8,448,970 B1
(45) Date of Patent: May 28, 2013

(54) SUSPENSION SYSTEM FOR STEERABLE FRONT WHEEL OF VEHICLE

(76) Inventor: Douglas L. Vardon, Canal Fulton, OH (US)

( * ) Notice: Subject to any disclaimer, the term of this patent is extended or adjusted under 35 U.S.C. 154(b) by 64 days.

(21) Appl. No.: 13/135,298

(22) Filed: Jun. 30, 2011

(51) Int. Cl.
*B62K 21/02* (2006.01)

(52) U.S. Cl.
USPC ............ 280/279; 280/276; 280/277; 280/286

(58) Field of Classification Search
USPC .................................. 280/279, 276, 277, 286
See application file for complete search history.

(56) References Cited

U.S. PATENT DOCUMENTS

| | | | |
|---|---|---|---|
| 435,477 A | 9/1890 | Blackledge | 280/277 |
| 1,189,874 A | 7/1916 | Schickel | 280/277 |
| 1,527,133 A | 2/1925 | Harley | 280/277 |
| 1,834,308 A | 12/1931 | Harley | 280/276 |
| 2,038,011 A | 4/1936 | Spetgler et al. | 280/277 |
| 2,751,991 A | 6/1956 | Mennesson | 180/277 |
| 3,701,544 A | 10/1972 | Stanovich | 280/276 |
| 3,730,553 A | 5/1973 | Harman | 280/277 |
| 3,753,578 A | 8/1973 | Rupp, II | 280/276 |
| D231,517 S | 4/1974 | Kennedy | D12/118 |
| 3,866,946 A | 2/1975 | Robison | 280/279 |
| 4,184,695 A | 1/1980 | Roe et al. | 280/277 |
| 4,401,316 A | 8/1983 | Miyakoshi et al. | 280/277 |
| 4,410,196 A | 10/1983 | Ribi | 280/276 |
| 4,431,204 A | 2/1984 | Miyakoshi et al. | 280/277 |
| 4,433,850 A | 2/1984 | Miyakoshi et al. | 280/277 |
| 4,433,851 A | 2/1984 | Miyakoshi et al. | 280/277 |
| 4,444,406 A | 4/1984 | Isono | 280/277 |
| 4,531,755 A | 7/1985 | Isono | 280/277 |
| 4,565,384 A | 1/1986 | Dehnisch | 280/279 |
| 4,570,963 A | 2/1986 | Isono | 280/277 |
| 4,629,205 A | 12/1986 | Haynes | 280/277 |
| 5,398,954 A | 3/1995 | Chonan | 280/276 |
| 5,829,773 A | 11/1998 | Rajaee | 280/276 |
| 5,967,538 A | 10/1999 | Callaluca et al. | 280/279 |
| D417,416 S | 12/1999 | Storz et al. | D12/118 |
| 6,017,047 A | 1/2000 | Hoose | 280/276 |
| 6,155,370 A | 12/2000 | Iwai et al. | 180/222 |
| D452,836 S | 1/2002 | Storz et al. | D12/118 |
| 6,336,647 B1 | 1/2002 | Iwai et al. | 280/276 |
| 6,457,732 B2 | 10/2002 | Ito et al. | 280/277 |
| 6,513,822 B1 | 2/2003 | Chonan | 280/276 |
| 6,520,524 B1 | 2/2003 | Costa | 280/276 |

(Continued)

OTHER PUBLICATIONS

Sugar Bear Past and Present—2 Page Article From http://www.sugarbearchoppers.com (Date Unknown).

*Primary Examiner* — Tashiana Adams
*Assistant Examiner* — Marlon Arce
(74) *Attorney, Agent, or Firm* — David A. Burge

(57) ABSTRACT

A suspension system for a steerable front wheel of a vehicle such as a motorcycle has two substantially identical, straight, elongate, tubular members that extend forwardly and downwardly from the vicinity of a handlebar of the vehicle along opposite sides of a lower rear quadrant of the front wheel and have open front end regions that at least partially enclose compressible coil suspension system springs. Elongate arms are pivotally connected to brackets that are rigidly secured either above or below the open front end regions of the elongate members, define surfaces that extend across the open front ends of the front end regions to be pressed against by the suspension system springs, and have upper end regions that support opposite ends of a front wheel's axle that extends between the two elongate arms. By adjusting the extent to which the suspension springs are compressed, the ride provided by the suspension system is adjusted.

16 Claims, 7 Drawing Sheets

U.S. PATENT DOCUMENTS

| | | |
|---|---|---|
| 6,786,499 B2 | 9/2004 | Ackley .......................... 280/276 |
| 6,896,276 B1 | 5/2005 | Sparrow ....................... 280/276 |
| 6,926,297 B2 | 8/2005 | Czysz .......................... 280/276 |
| 6,966,571 B2 | 11/2005 | Czysz .......................... 280/279 |
| 6,979,011 B2 | 12/2005 | Czysz .......................... 280/276 |
| D514,477 S | 2/2006 | Doll ............................ D12/118 |
| 7,111,700 B2 | 9/2006 | Czysz .......................... 180/219 |
| 7,111,861 B2 | 9/2006 | Pender ........................ 280/279 |
| 7,182,357 B2 | 2/2007 | Czysz .......................... 280/276 |
| 7,185,905 B2 | 3/2007 | Czysz .......................... 280/276 |
| 7,207,585 B2 | 4/2007 | Czysz .......................... 280/276 |
| D542,718 S | 5/2007 | Costa .......................... D12/118 |
| 7,210,695 B2 * | 5/2007 | Griffiths ....................... 280/283 |
| 7,350,787 B2 * | 4/2008 | Voss ............................. 280/5.5 |
| 7,438,306 B2 | 10/2008 | Mrdeza et al. .............. 280/279 |
| 7,441,622 B2 | 10/2008 | Costa .......................... 180/219 |
| 7,490,843 B2 | 2/2009 | Czysz .......................... 280/283 |
| 7,546,894 B1 | 6/2009 | Glenn .......................... 180/277 |
| 7,578,514 B2 | 8/2009 | Czysz .......................... 280/276 |
| 7,832,752 B2 | 11/2010 | Czysz .......................... 280/283 |
| 2007/0144845 A1 | 6/2007 | Saito ............................ 188/281 |

* cited by examiner

SUSPENSION SYSTEM FOR STEERABLE FRONT WHEEL OF VEHICLE

REFERENCE TO CONCURRENTLY FILED DESIGN PATENT APPLICATION

Reference is made to a concurrently filed U.S. design application entitled COMPONENTS OF A FRONT END REGION OF A MOTORCYCLE, 29/374,071, the disclosure of which is incorporated herein by reference.

BACKGROUND

The present invention relates to a suspension system for supporting a single steerable front wheel of a vehicle such as a customized motorcycle, typically known as a "chopper."

A chopper usually has one or two pairs of elongate members that extend in a substantially parallel manner forwardly and downwardly from the vicinity of the vehicle's handlebar at a rake angle of about 45 degrees to about 60 degrees from the vertical to give the chopper its unique and interesting look. One pair of the elongate members may mount opposite ends of the vehicle's front wheel axle, or may pivotally connect with ends of arms that have overlying opposed ends that mount the vehicle's front wheel axle. If a second pair of elongate members is present, the members of the second pair usually connect with the elongate arms that support the front wheel axle and serve to transmit vibration from the front wheel rearwardly and upwardly toward the handlebar where suspension system springs are provided to cushion the vibration.

The arrangements just described are disadvantageous because they do not deal with front wheel vibration in the vicinity of the front wheel where it originates, but rather transmit front wheel vibration rearwardly and upwardly through a pair of the elongate components to be dealt with by springs which must be heavier than would be needed if the vibration that originated with the front wheel had not been introduced to and transmitted rearwardly and upwardly along the elongate members.

Disadvantages also arise because the arrangements just described bring a large amount of "trail" and attendant steering difficulty to choppers. "Trail" is the distance measured horizontally along the ground level between a point that lies directly beneath the front axle, and at a point defined by the intersection of the ground level with an imaginary line extended through, and at the same angle as, the vehicle's steering stem. While a small amount of trail measurement is desirable to give the vehicle good handling characteristics, the trail measurement is best minimized. However, most chopper suspension systems have a design that leaves the trail measurement relatively large, even though considerations of trail measurement are far more important than are rake angle considerations in determining how well any given frame and fork geometry combination will handle on the road.

Suspension systems embodying features of the present invention are advantageous in that the suspension system deals with front wheel vibration in close proximity to the front wheel instead of transmitting this vibration upwardly and rearwardly along relatively heavy elongate members, and in that the suspension system tends to provide the steerable front wheel of a chopper with a relatively small or minimal trail measurement and desirable accompanying over-the-road stability.

Suspension systems embodying preferred features of the present invention also are advantageous in that they provide for essentially vertical (up and down) movement of the front wheel in response to the front wheel dropping into a chuckhole or engaging a pronounced bump in the road—and, in that this vertical up-down front wheel movement is immediately cushioned at locations quite near to (indeed at locations on opposite sides of) the front wheel, rather that requiring that the up-down movement of the front wheel be transmitted as a jolt to near the handlebar where the force of the jolt is finally cushioned by remotely acting suspension system springs.

SUMMARY

The following summary briefly outlines some of the features of selected embodiments of the invention as claimed later herein.

In some embodiments, a suspension system for a steerable front wheel of a vehicle has two substantially identical elongate, parallel members that extend forwardly and downwardly along opposite sides of a lower rear quadrant of the front wheel. Each of the elongate members pivotally mounts a separate associated elongate arm that extends upwardly and is pressed forwardly and downwardly by a separate coil spring that projects out of an associated one of the elongate members to cushion over-the-road vibration that is imparted to a front wheel axle that extends between and connects the elongate arms. Threaded fasteners extend through the coil springs and through openings that are defined by substantially flat surfaces of the upwardly extending arms, and carry nuts that can be adjusted to adjust spring compression.

Preferably each of the elongate members is tubular along its full length, with portions that extend upwardly and to the rear of the spring-compressing threaded fasteners being substantially filled with elongate rod stock. Expansible plugs preferably are provided to close rearwardly opening end regions of the tubular elongate members.

Preferably the elongate arms extend in substantially parallel, side-by-side relationship and are configured to position the front wheel axle a short distance forwardly of the front ends of the elongate members to give the vehicle a relatively short trail measurement of only about 1 to about 3 inches. Preferably the rake angle at which the elongate members extend forwardly and downwardly is within a range of about 45 degrees to about 55 degrees from the vertical.

In some embodiments, a suspension system for a steerable front wheel of a motorcycle has two substantially identical, straight, elongate, tubular members having open front end regions that extend forwardly and downwardly from the vicinity of a handlebar of the vehicle along opposite sides of a lower rear quadrant of the front wheel. The elongate members have open front end regions that at least partially enclose compressible coil suspension system springs which press against elongate arms that are pivotally connected to brackets carried by the elongate members. The elongate arms define substantially flat surfaces that preferably extend substantially perpendicularly across the open front end regions and are engaged by the suspension system springs. The arms extend forwardly and upwardly to support opposite ends of the front wheel's axle. The extent to which the compression system springs are compressed by the arms is adjusted to adjust the ride that is provided to the vehicle by the suspension system.

In some embodiments, a suspension system for a steerable front wheel of a vehicle consists of two substantially identical assemblies that extend on opposite sides of a front wheel for supporting opposite end regions of a front axle that carries the front wheel, wherein each of the assemblies 1) has an elongate tubular member extending forwardly and downwardly to define a front end region that lies beside a lower rear quadrant of the front wheel, 2) has a bracket rigidly connected to the front end region for defining a pivotal mount located forwardly and below the front end region, 3) has an elongate arm that extends upwardly and forwardly alongside the elongate tubular member from a lower end region of the arm that is pivotally connected to the pivotal mount to provide an upper end region that supports one of two opposite ends of the front axle, and 4) has a suspension system coil spring that projects forwardly from the open front end region of the elongate tubular member to press against a substantially flat surface of the upwardly extending arm.

These and other preferred features will be more fully understood by referring to the accompanying drawings taken together with the detailed description and claims that follow.

BRIEF DESCRIPTION OF THE ACCOMPANYING DRAWINGS

In the accompanying drawings:

FIG. 1 is a side elevational view of basics of a customized vehicle such as a chopper type motorcycle having a rake angle of about 55 degrees, showing a frame that rotatably supports a rear wheel, a steerable pair of forwardly and downwardly extending members that pivotally carry upwardly and forwardly extending curved arms that mount opposite ends of a front wheel axle that rotatably mounts a front wheel, with a seat shown connected to the frame, and a handlebar provided to steer the front wheel, and depicting points A and B that yield a short trail;

Figure 3:
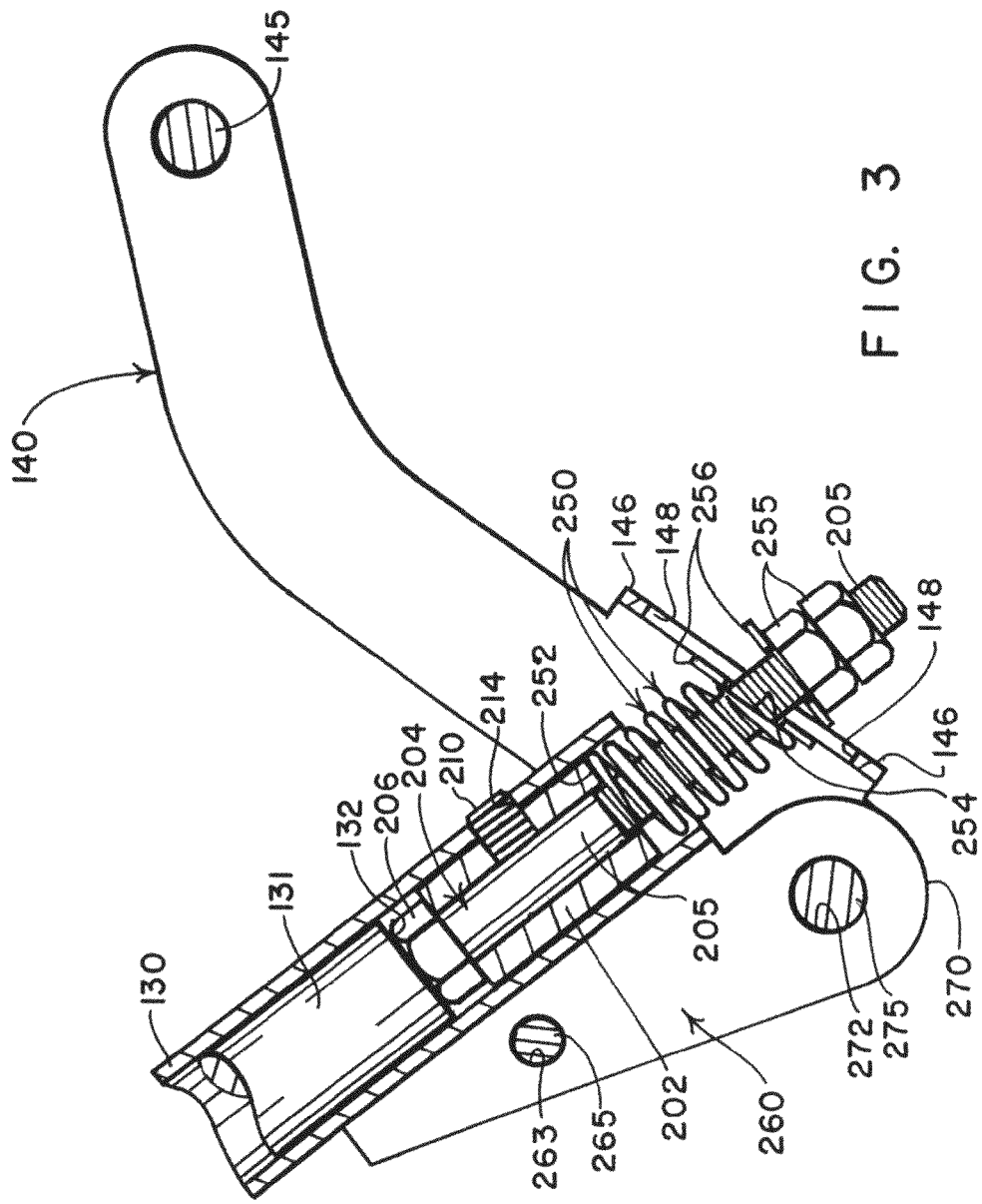
FIG. 3 is an enlarged view, partially in cross-section, that shows selected components of the assembled suspension system of FIG. 2.
Figure 7:
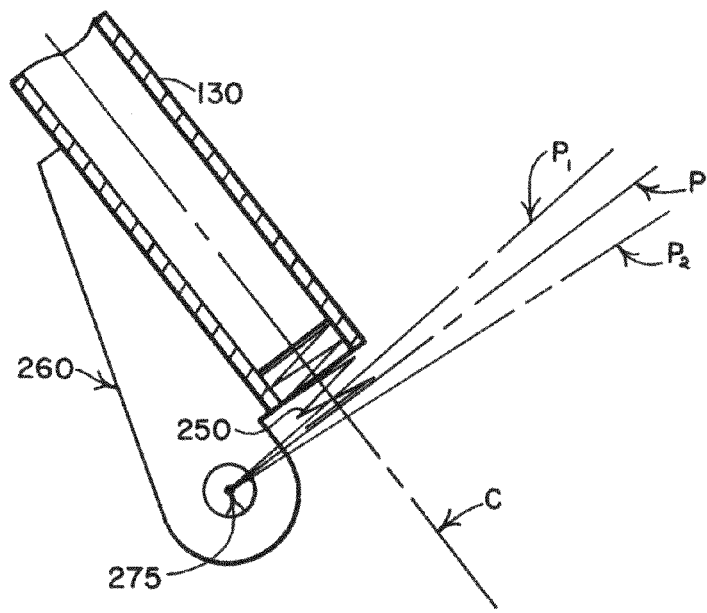
Figure 8:
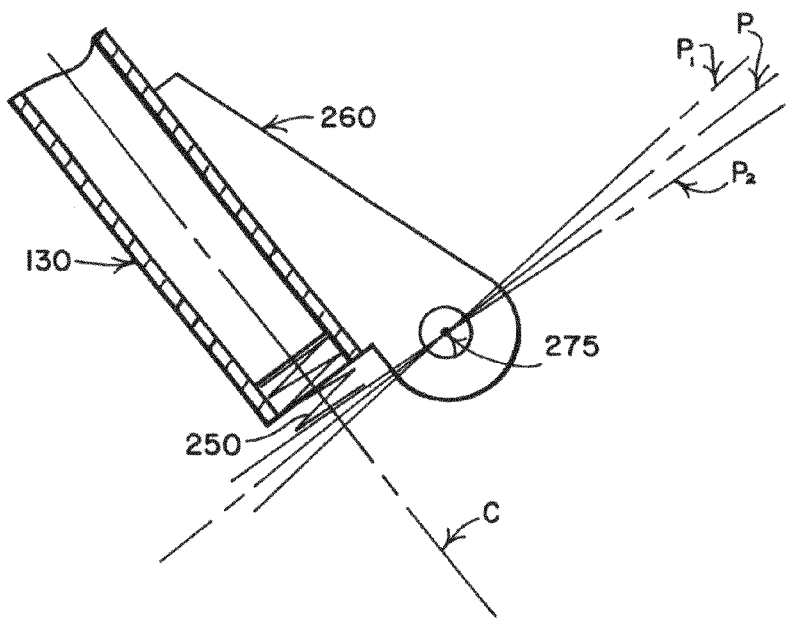

FIG. 7 is a schematic diagram illustrating a preferred geometry of selected parts of the suspension system portion that is depicted in FIG. 3, which has a depending bracket for pivoting an upwardly extending arm; and, FIG. 8 is a schematic diagram like the diagram of FIG. 7 but showing a preferred geometry of a suspension system having an upwardly extending bracket for supporting an upwardly extending arm.

DETAILED DESCRIPTION

Figure 1:
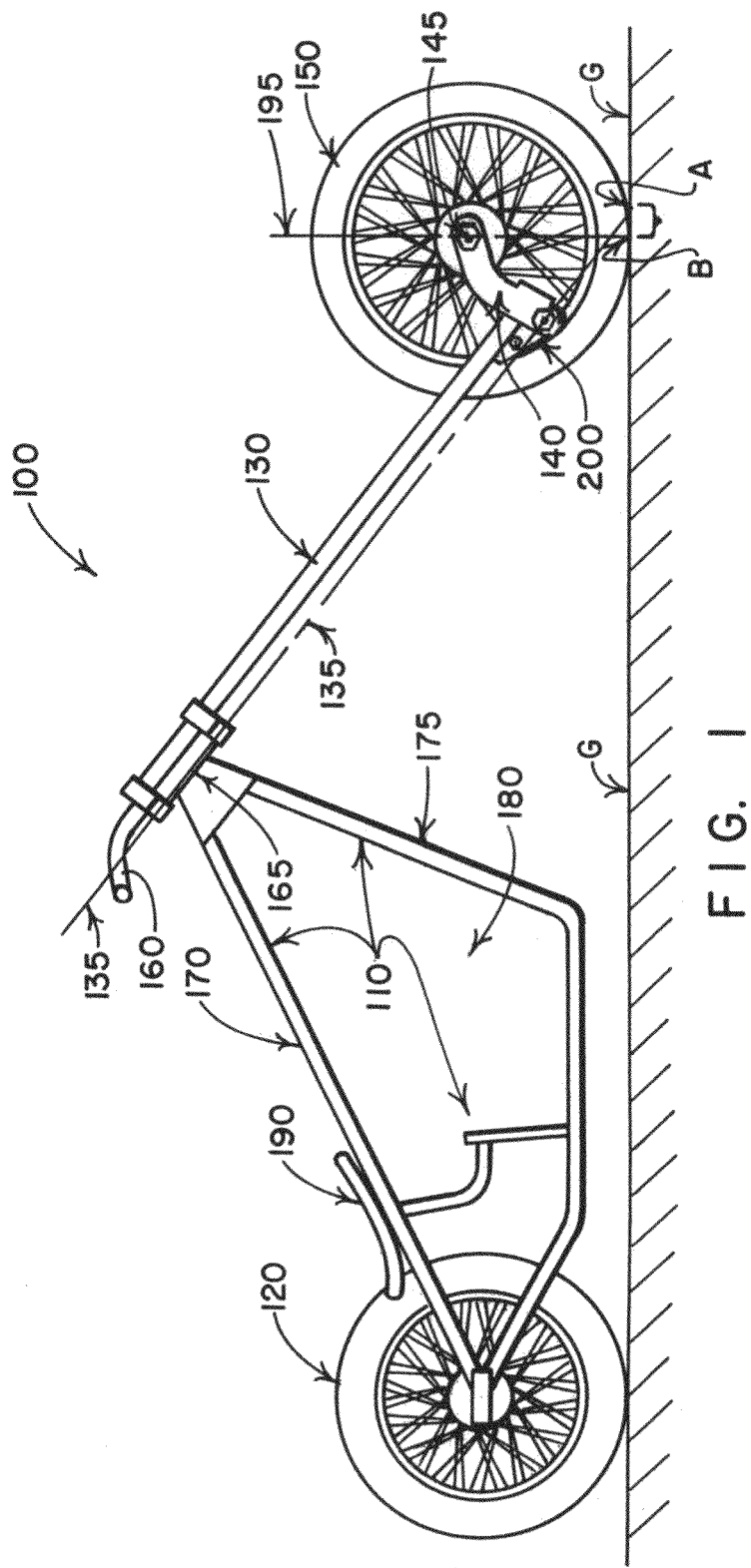

Referring to FIG. 1, a steerable front wheel vehicle, such as a customized motorcycle 100, is shown in "bare bones" form. The vehicle 100 has a frame 110 that rotatably supports a rear wheel 120, and has pair of elongate front members 130 that carry a pair of elongate, upwardly extending arms 140 for rotatably supporting a front wheel 150 that can be steered by a handlebar 160. The handlebar 160 is turnably connected by a tripletree 165 to the frame 110. The tripletree 165 permits the handlebar 160 to turn the elongate front members 130 relative to the frame 110 about a steering stem axis 135 of the vehicle 100.

The frame 110 is a welded structure that has upper and lower parts 170, 175 which are usually formed from tubular stock to reduce the weight of the vehicle 100. The upper and lower parts 170, 175 of the frame 110 extend forwardly from a rear location where they join to rotatably mount the rear wheel 120, to a forward location where they again join to mount the tripletree 165. Defined between central portions of the frame's upper and lower parts 170, 175 is an engine mounting space 180 where any of a wide variety of commercially available engines (not shown) may be mounted and drivingly connected to the rear wheel 120. A seat 190 selected from among many commercially available types is suitably connected to the upper part 170 of the frame 110. A kickstand (not shown) and other commercially available components (not shown) that are suitable and common to motorcycles also may be connected to the frame 110, as desired.

Figure 2:
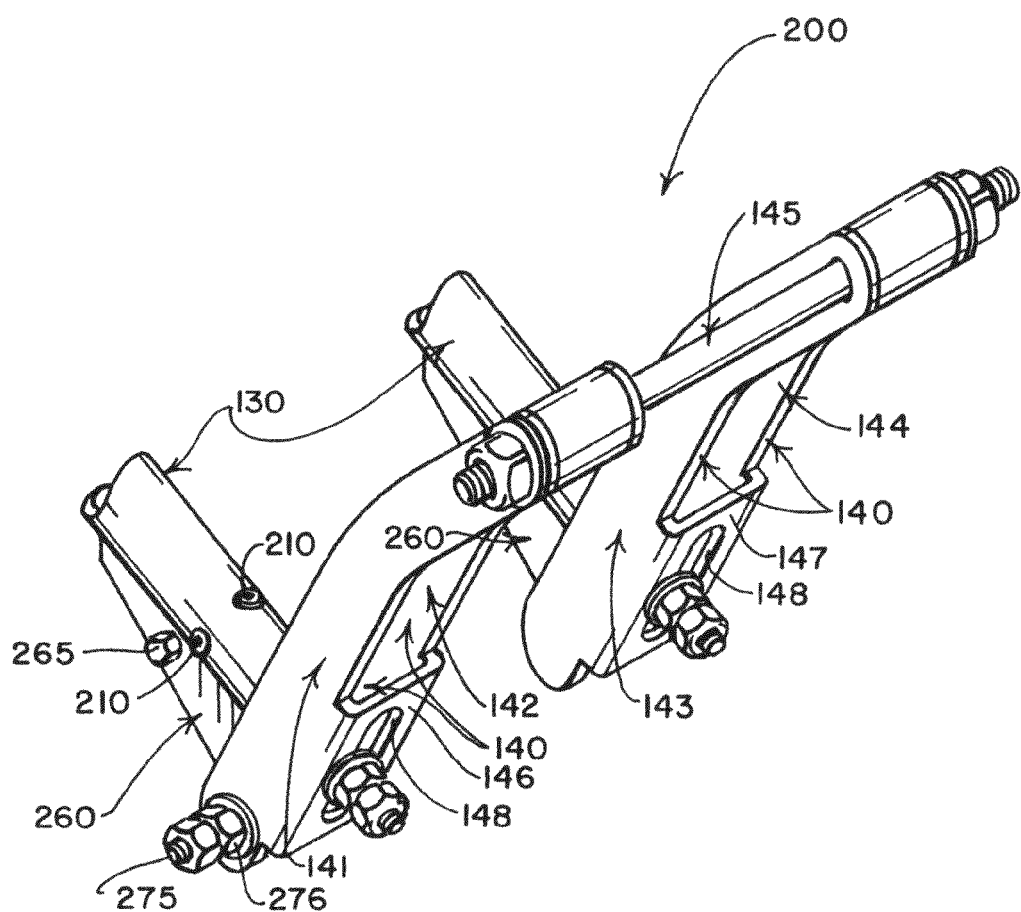
FIG. 2 is an enlarged perspective view of selected assembled components of a suspension system that is provided between the elongate members and the curved arms of the vehicle of FIG. 1.
Figure 5:
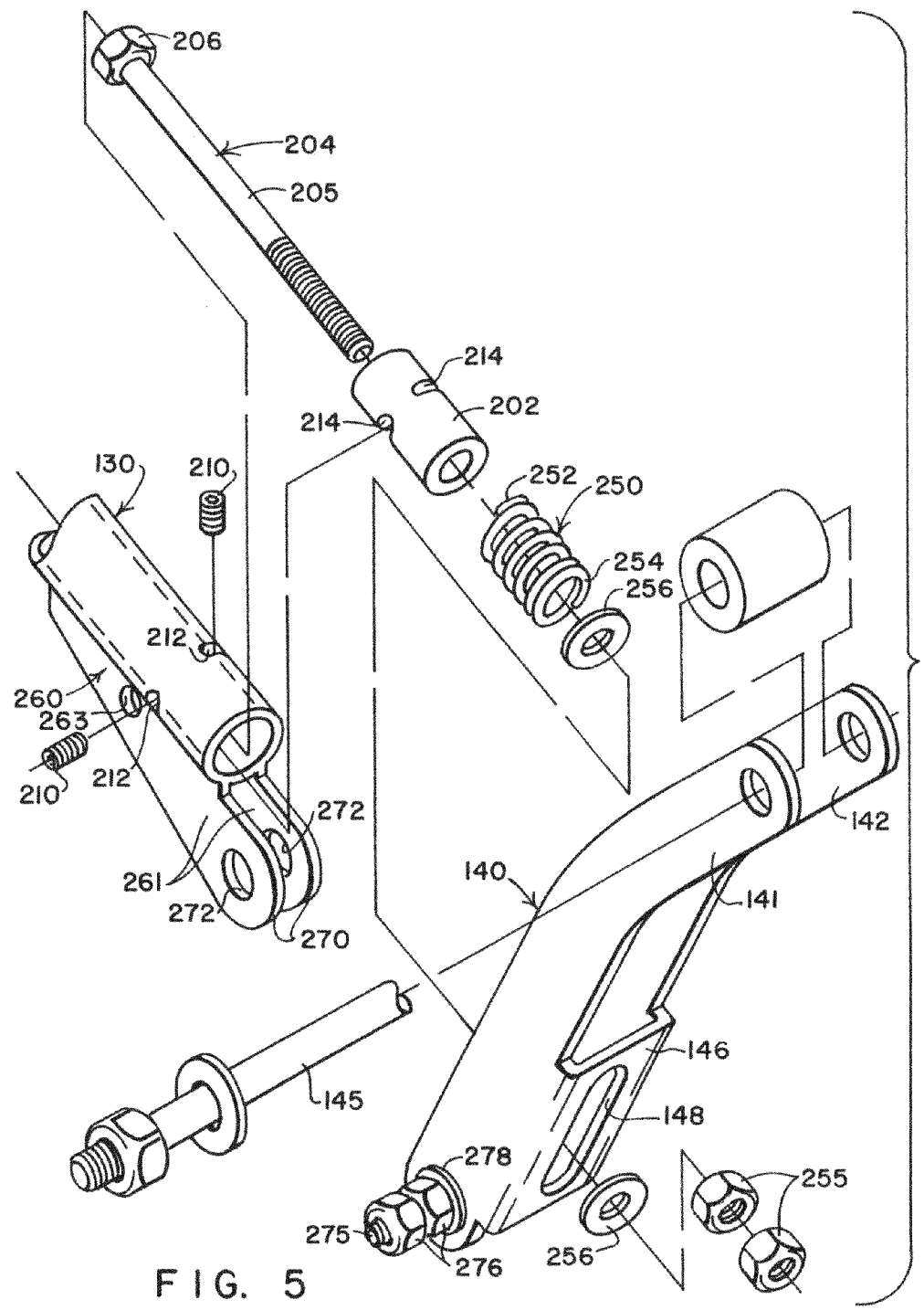
FIGS. 5 and 6 are enlarged, partially exploded views of selected components of the suspension system of FIG. 2.
Figure 6:
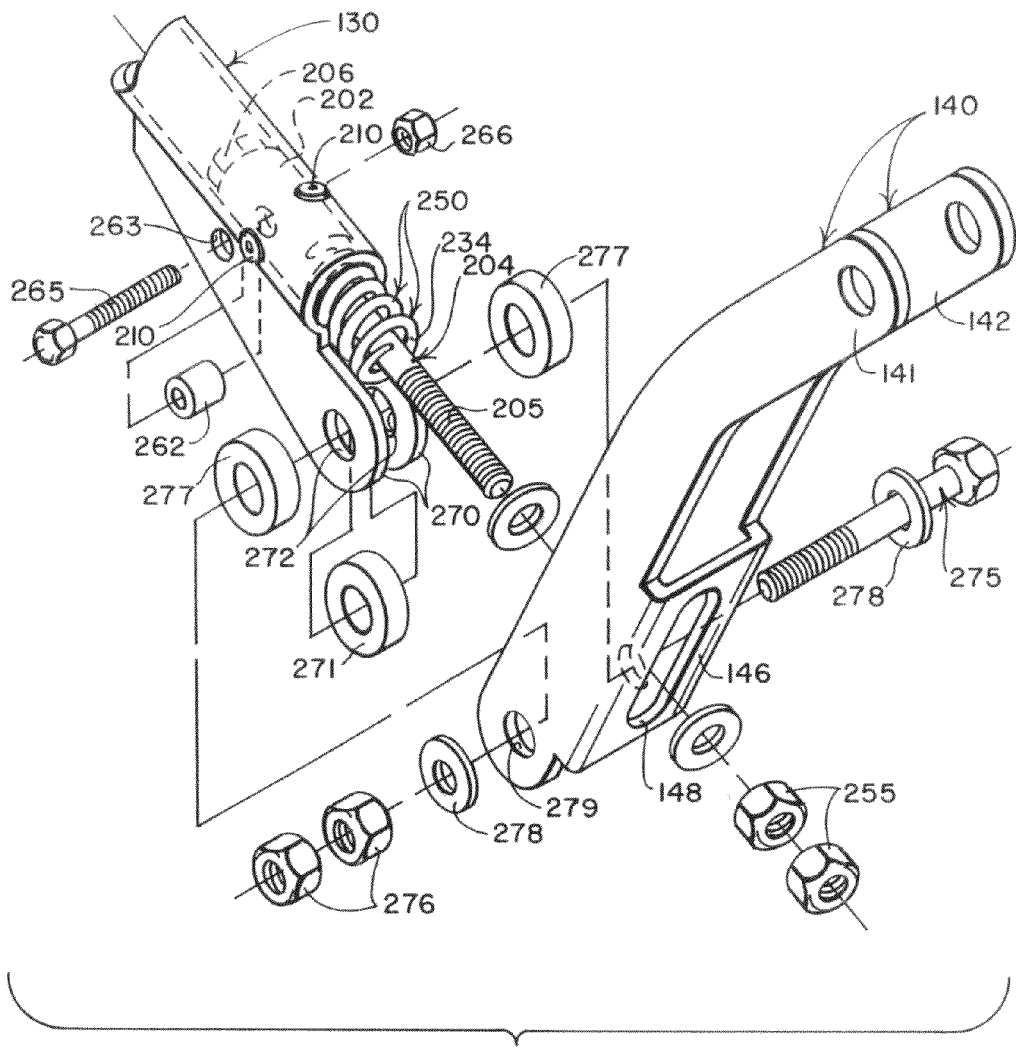

A front suspension system 200 is located on opposite sides of the steerable front wheel 150, defined in part by, and located near the junctions of, the elongate members 130 and the elongate arms 140. Although relatively little of the suspension system 200 can be seen in the side views of FIGS. 1 and 4, the enlargement of FIG. 2 shows more clearly some of the assembled components of the suspension system 200. The further enlargement of FIG. 3 shows selected components of one of two identical assemblies that form the suspension system 200; and, FIGS. 5 and 6 show selected components of the suspension system assembly of FIG. 3 in various states of disassembly.

Referring to FIG. 2, the elongate members 130 consist of two identical members that extend in side-by-side, parallel relationship, a typical one of which is shown in FIGS. 1 and 3-6. The elongate members 130 are preferably formed from tubular stock. As is also best seen in FIG. 2, the upwardly extending arms 140 are preferably formed from plate stock, and actually consist of four curved arms 141, 142, 143, 144 that extend in spaced, side-by-side, parallel relationship.

The curved arms 141, 142 are rigidly connected by a transversely extending, relatively flat member 146. In identical fashion, the arms 143, 144 are connected by a transversely extending, relatively flat member 147 that can only be seen in FIG. 2, where it can also be seen that all four of the curved arms 141, 142, 143 and 144 are rigidly connected and rigidly held in spaced, side-by-side relationship by a front axle 145 that journals the front wheel 150 for rotation. The members 146, 147 can be formed integrally with the arms 141, 142 and 143, 144, respectively, or can be formed separately by individual elements (not shown) that are welded in place.

The actual configuration or shape of the curved arms 141, 142, 143, 144 has aesthetic importance in giving the vehicle 100 an interesting and pleasing appearance. And, the shape of the arms 141, 142, 143, 144 is also of importance in tending to confine the axis of the front wheel 150 to up-down vertical movements, so that the front wheel 150 is assured of moving primarily vertically to not significantly forwardly and rearwardly jolt the vehicle 100 when the front wheel 150 drops briefly into a chuckhole, or is rapidly raised by engaging a roadway bump.

Figure 4:
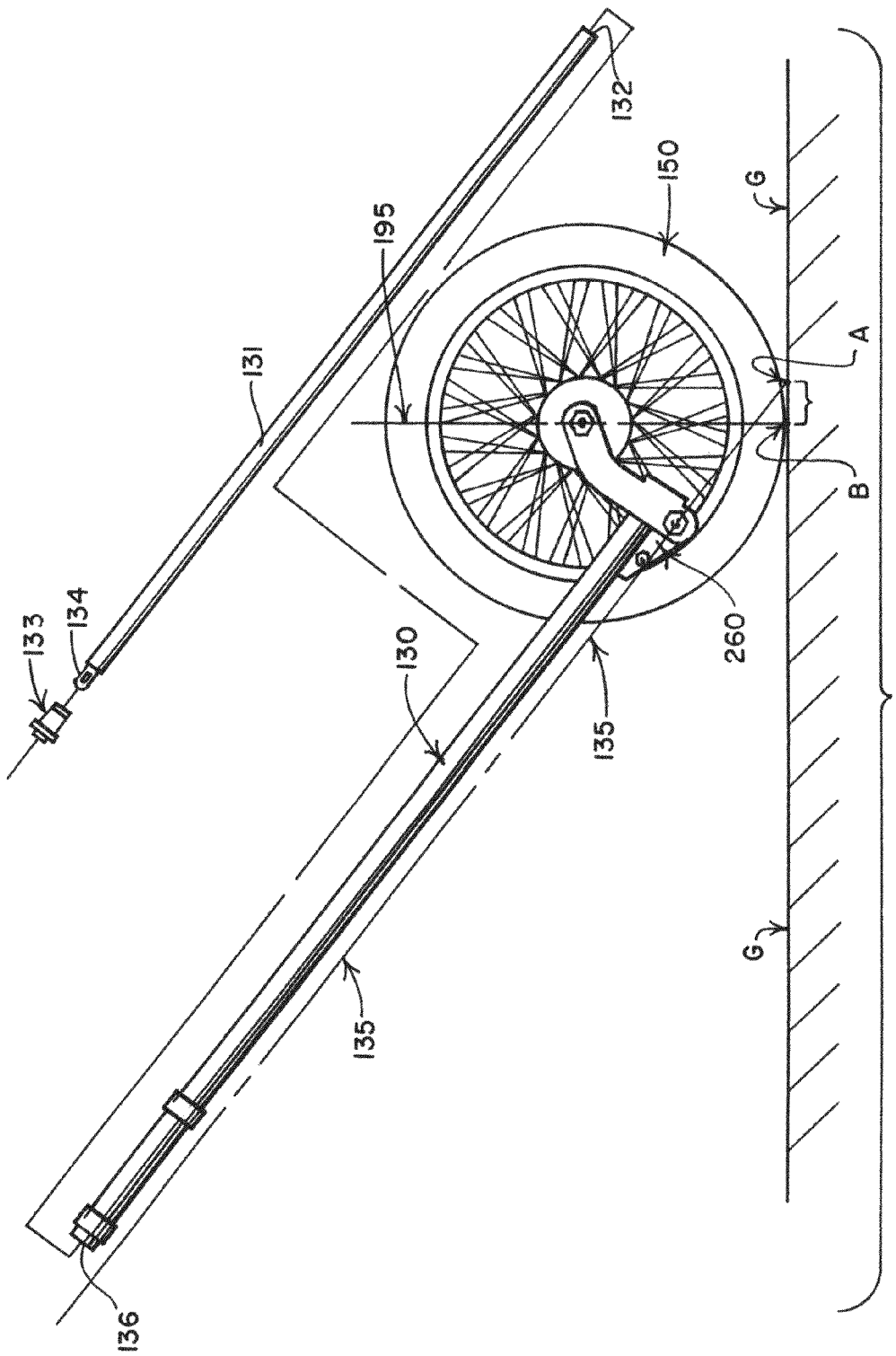
FIG. 4 is a partially exploded view of front end components of the vehicle of FIG. 1, with imaginary lines again showing how a short positive trail measurement of the vehicle of FIG. 1 is determined.

The relative positions of the pivot axis 275 of the arms 141, 142, 143, 144 and the pivot axis 145 of the front wheel 150 also is of importance and needs to be coordinated with the rake angle of the vehicle's members 130 to ensure that the vehicle 100 has a positive trail measurement that preferably is relatively short, as determined by the distance between points A and B, which are shown in FIGS. 1 and 4, as is needed to give the vehicle 100 good over-the-road stability.

Keeping the foregoing in mind, the arm members 141, 142, 143, 144 are configured, and the flat members 146, 147 are adjusted (by means of the cap screws 204 and nuts 255) to extend substantially perpendicularly across the open front end region of the elongate tubular members 130 to flatly compress (to substantially perpendicularly compress) the suspension system springs 250 into the open front ends of the elongate tubular members 130 to a desired extent that gives the vehicle 100 a desired "feel" or "ride." The members 146, 147 are slotted as is indicated by the numerals 148 in FIGS. 2, 3, 5 and 6, to accommodate movement of cap screws 204 along the lengths of the slotted openings 148 as the elongate arms 140 pivot about the threaded fasteners 275 relative to the elongate tubular members 130 under the influence of substantially vertical (up and down movement) of the front wheel, which also can be thought of as front wheel vibration.

Referring to FIG. 4, the elongate, tubular, forwardly and downwardly extending, side-by-side members 130 are each strengthened by identical, snugly fitting, solid metal insert rods 131 that substantially fill the otherwise empty spaces within the elongate, tubular members 130. In FIG. 3, a front end 132 of one of the insert rods 131 is shown engaging the hex head 206 of a cap screw 204.

In FIG. 4, a commercially available expansible plug assembly 133 is shown, identical ones of which are used to engage rear end regions 134 of the insert rods 131 to close the open rear end regions 136 of the elongate, tubular members 130. The rear end regions 134 of the insert rods 131 are flattened as shown in FIG. 4 to provide thin formations that can be grasped by a tool such as pliers (not shown) to facilitate insertion into and removal of the insert rods 131 from the elongate, tubular members 130.

Referring to FIGS. 3 and 5, identical tubular collars 202 are inserted snugly inside the open front ends of each of each of the elongate tubular members 130, and the identical cap screws 204 have stems 205 that are inserted through the collars 202. The cap screws 204 have hex heads 206, the undersides of which rest against upwardly and rearwardly facing end regions of the collars 202, and threaded front stems 205 that project out of the open front ends the elongate tubular members 130.

Referring to FIG. 5, set screws 210 extend through holes 212 that are drilled in the elongate tubular members 130 and are threaded into holes 214 that are formed in the collars 202. When the set screws 210 are tightened in place, the set screws 210 clamp against the stems 205 of the cap screws 204 and prevent the cap screws 204 and the collars 202 from turning relative to, and from moving relatively along the lengths of, the elongate tubular members 130.

While FIG. 3 shows only one set screw 210 being used to extend through each of the elongate tubular members 130 into each of the collars 202, FIGS. 2, 5 and 6 show two of the set screws 210 being provided for this purpose. Any desired number of the set screws 210 may be used at desired locations that intersect with the tubular members 130, the collars 202 and the cap screws 204 to keep the collars 202 and the cap screws 204 from moving relative to the elongate tubular members 130.

Referring to FIGS. 5 and 6, the suspension system 200 includes compressible coil springs 250 that have flat rear end regions 252 that press against the front ends of the collars 202, and flat front end regions 254 that press against the flat members 146, 147 that interconnect the arms 141, 142 and 143, 144, respectively. The cap screws 204 extend through the coils of the springs 250, through the slots 148 of the flat members 146, 147, and have nuts 255 that can be tightened or loosened to adjust the extent to which the springs 250 are compressed, so as to adjust the "feel" of the suspension system 200. Washers 256 are provided, as needed, on the cap screw stems 205 to engage opposite sides of the flat, slotted members 146, 147.

As can best be seen in FIGS. 3, 5 and 6, brackets 260 are welded to the undersides of the front end regions of the tubular members 130. The brackets 260 include two pairs of identical, side-by-side members 261, with each pair 261 being held in spaced relationship by bushings 262 (FIG. 6) that are positioned between aligned holes 263 formed through rear portions of the brackets 260. Cap screws 265 (FIG. 6) extend through the bushings 262 and the aligned holes 263, and are secured by nuts 266 (FIG. 6).

Referring to FIGS. 5 and 6, front end regions 270 of the brackets 260 are rounded, are spaced apart by bushings 271 (FIG. 6), and are provided with aligned holes 272 through which cap screws 275 extend that are secured by nuts 276. Referring to FIG. 6, additional bushings 277 are provided on opposite sides of each pair of the brackets 260, and the cap screws 275 extend through the bushings 277, washers 278 and through aligned holes 279 that are formed through each of the lower end regions of the curved arms 141, 142 and 143, 144, respectively, to pivotally mount the curved arms 140 on the brackets 260 of the elongate members 130.

As can best be seen in FIG. 4, the steering axis 135 of the vehicle is an imaginary line that intersects the ground surface G at a point A, which is located only a short distance forwardly from a point B where an imaginary vertical line 195 intersects the front wheel axle 145 and the ground surface G. The distance between points A and B is the positive trail measurement of the vehicle 100.

In accordance with the present invention, the elongate members 130 extend forwardly and downwardly to extend along opposite sides of the lower rear quadrant of the front wheel 150 so the elongate arms 140 can provide the slotted members 146, 147 with surfaces that extend in a common plane that substantially perpendicularly crosses the open front end regions of the elongate tubular members 130 to be pressed on by the coiled suspension system springs 250 when the elongate arms 140 are adjusted to provide the degree of compression that yields the "ride" that is desired, so the suspension system 200 nicely absorbs much of the front wheel vibration that may be encountered during over-the-road travel as the front wheel 150 encounters a chuckhole or rapid change of slope.

Different riders have different weights and have differing preferences about how the "ride" provided by the suspension system 200 should "feel," and will therefor want to adjust the nuts 255 to give the suspension system 200 different spring compressions, so the arms 140 may need to be somewhat differently configured to curve forwardly (or even rearwardly) to different degrees to preferably position the plane in which the members 146, 147 extend substantially perpendicularly relative to the axes of the elongate members 130.

A feature of the suspension system 200 of the present invention is that the elongate upwardly extending arms 140 can be differently configured to give the vehicle 100 substantially any desired trail measurement. Usually riders find like the upwardly extending arms 140 curved slightly forwardly to give a positive trail measurement of only about 1 to about 3 inches to give the vehicle 100 which can yield very desirable over-the-road handling characteristics. But some riders prefer different trail measurements that would cause the arms 140 to be differently configured so the point "B" is positioned differently with respect to point "A" than is shown in FIGS. 1 and 4.

The basic geometry of the suspension system 200 that is shown in FIG. 3 also is shown somewhat schematically in FIG. 7. Referring to FIG. 7, the depicted elongate tubular member 130 has a centerline "C. The elongate member 130 extends forwardly and downwardly to mount a depending bracket 260 so that the pivot axis that is established by the threaded fastener 275 can be seen beneath the centerline "C."

A plane in which the members 146, 147 extend is indicated by the letter "P" as extending substantially perpendicular to a centerline "C" of the elongate member 130 when the spring 250 is properly compressed for over-the-road travel; and, a range of a few degrees about which the plane "P" can pivot due to front wheel vibration is indicated by "$P_1$" and "$P_2$," which show how the plane "P" might move as the front wheel 150 vibrates 150, causing the arm 140 to pivot about the axis of the threaded fastener 275.

The compression resistance of the spring 250 and the adjustment of the nuts 255 (located on both sides of the front wheel 150) are normally selected and set in unison so that the weight of the rider who will operate the vehicle 100 (and any other weight regularly carried by the vehicle 100) causes the plane "P" to normally extend substantially perpendicular to the centerline "C." For example, as the front wheel 150 vibrates due to hitting a rock or a chuckhole, or due to other reasons, the plane "P" may move slightly back and forth within the range from about "$P_1$" to about "$P_2$" as the springs 250 work to absorb the front wheel vibration. A slightly heavier loading will cause the springs 250 to shorten slightly as they are more fully compressed, hence the plane "P" will move toward "$P_1$". A lighter loading of the springs 250 will permit the springs 250 to extend slightly in length, pivoting the plane "P" toward "$P_2$".

A feature of the suspension system 200 is that the brackets 260 actually can be reversed to position the pivot axes provided by the cap screws 275 a short distance above, rather than below, the elongate members 130, as is depicted in FIG. 8. In accordance with the arrangement of FIG. 8, the elongate arms 140 would be pivoted one way (clockwise or counterclockwise about the pivot axis of the fastener 275) when the loading on the front wheel 150 is increased, and oppositely when the loading on the front wheel 150 is decreased. However, absent front wheel vibration, the nuts 255 would be tightened to position the plane "P" so that it extends substantially perpendicular to the centerline "C" by the rider who would normally operate the vehicle 100.

Because the vast majority of riders will prefer the ride that results when the arms 140 pivot beneath the elongate members 130 rather than when the arms 140 pivot above the members 130, FIGS. 1-7 of the drawings illustrate only lower pivot positions that result from the brackets 260 depending beneath the elongate members 130 instead of extending above the members 130.

Whereas most custom motorcycles of the chopper class have relatively large non-adjustable trail measurements that give the resulting vehicles undesirable over-the-road handling characteristics, the suspension system 200 of the present invention is adjustable and can provide the vehicle 100 not only with a small trail measurement, preferably within the range of about 1 to about 3 inches, but also can provide substantially any other trail measurement that a particular rider may prefer.

Whereas most custom motorcycles of the chopper class transmit front wheel vibration rearwardly and upwardly along elongate members on opposite sides of the steerable front wheel 150, the suspension system 200 of the present invention is designed to deal with front wheel vibration near to (indeed, on opposite sides of the lower rear quadrant of) the front wheel 150 instead of transmitting a major part of this vibration upwardly and rearwardly to be dealt with in the vicinity of the handlebar 160 and the tripletree 165 as much of vehicle 100 is caused to shake undesirably. By this arrangement, smaller springs 250 can be used in the suspension system 200, and the vehicle 100 has a smoother, safer ride.

The suspension system of the present invention offers the option to shape the elongate arms 141, 142, 143, 144 as may be needed to position the axis of front wheel rotation (as determined by the front wheel axle 145) relative to the axis about which the arms 141, 142, 143, 144 pivot (as determined by the fasteners 145)—so that, to a desired extent, the front wheel rotation axis is positioned forwardly with respect to the pivot axis of the arms 141, 142, 143, 144. Stated in another way, the arms 141, 142, 143, 144 can be configured or shaped to cause the front wheel 150 to move primarily (or to a significant extent) vertically (up and down) rather than primarily horizontally (forwardly and rearwardly) when, for example, the front wheel 150 drops into a chuckhole, or is momentarily elevated by striking a roadway bump. This forward positioning of the front wheel rotation axis relative to the pivot axis of the arms 141, 142, 143, 144 is desirable in that the resulting front wheel vibration (its jolting up and down movement or vibration) need not be transmitted as a teeth-jarring horizontal impact that significantly horizontally jerks the vehicle 100 in forward and rearward directions, but rather can be (and preferably is) dealt with, stifled, quelled, and cushioned by the suspension system springs 250 at convenient locations on opposite sides of the lower rear quadrant of the front wheel rather than to be transmitted harshly rearwardly and upwardly toward the handlebar 160 to hopefully be stifled by relative large suspension system springs located near the handlebar and tripletree (as is the case with many previously proposed front wheel suspension systems for steerable front wheels of vehicles such as motorcycles).

By giving the vehicle 100 a less harsh and more comfortable ride that also is more easy to control (due to a desirably short trail measurement that also can be easily designed into the suspension system of the present invention in ways that have been explained previously), the suspension system of the present invention is capable of significantly enhancing the safety of the vehicle 100, which is an important objective to also keep in mind in selecting the character of the steerable front wheel suspension system to be utilized in the custom design of a thoughtfully conceived vehicle such as a chopper type motorcycle.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention.

What is claimed is:

1. A suspension system for a steerable front wheel of a vehicle comprising two substantially identical elongate members that extend forwardly and downwardly toward and along opposite sides of a lower rear quadrant of the front wheel, with an open front end region of each elongate member pivotally mounting a separate associated elongate arm that extends upwardly and is pressed against by a separate coil spring that extends forwardly from the open front end region of an associated one of the elongate members to cushion over-the-road vibration that may be imparted to a front wheel axle which extends between and rigidly connects the elongate arms, wherein each of the elongate members carries an associated threaded fastener that extends through an associated one of the coil springs, and each threaded fastener carries an associated threaded nut that can be adjusted to adjust the compression of the associated coil spring, and wherein each of the elongate members is tubular along its full length, and portions of each of the elongate members extending rearwardly from the associated threaded fastener is substantially filled by an associated elongate rod element.

2. The suspension system of claim 1 additionally including an adjustment means for adjustably compressing the coil springs to adjustably cushion the vibration.

3. The suspension system of claim 1 wherein each of the associated threaded fasteners is fixed to the associated one of the elongate members.

4. The suspension system of claim 3 wherein each of the threaded fasteners extends through an opening defined by an associated flat formation of associated one of the elongate arms.

5. The suspension system of claim 1 wherein each of the elongate members has a tubular front end region that houses only a rear part of an associated one of the coil springs.

6. The suspension system of claim 5 wherein expansible plug members close rearwardly opening end regions of the tubular elongate members.

7. The suspension system of claim 1 wherein each of the elongate arms is curved to position the front wheel axle a selected distance in a selected direction that will give the vehicle a desired trail measurement that is selected to be either positive or negative.

8. The suspension system of claim 1 wherein the upwardly extending arms substantially parallel each other, and the elongate members have a rake angle within a range of about 45 degrees to about 55 degrees from the vertical.

9. A suspension system for a steerable front wheel of a vehicle consisting of two substantially identical assemblies that extend on opposite sides of a front wheel for supporting opposite end regions of a front axle that carries the front wheel, wherein each of the assemblies 1) has an elongate tubular member extending forwardly and downwardly to define an open front end region that lies beside a lower rear quadrant of the front wheel, 2) has a bracket rigidly connected to the open front end region for defining a pivotal mount located forwardly and below the open front end region, 3) has an elongate arm that extends upwardly beside the elongate tubular member from a lower end region that is pivotally connected to the pivotal mount to provide an upper end region that supports one of two opposite ends of the front axle, and 4) has a coil spring projecting forwardly from the open front end region to press against the elongate upwardly extending arm at a location between the upper and lower end regions, wherein each of the elongate members is tubular along its full length, and portions of each of the elongate members extending to the rear of an associated threaded fastener is substantially filled with elongate rod stock.

10. The suspension system of claim 9 wherein each of the assemblies has a threaded member projecting from the open front end of the tubular member through the coil spring and through an opening defined by an associated one of the upwardly extending arms.

11. The suspension system of claim 10 wherein each of the threaded members also carries a threaded fastener that can be adjusted to compress the coil spring to varying degrees to adjust the ride provided by the suspension system.

12. The suspension system of claim 11 wherein each of the threaded fasteners is fixed to an associated one of the elongate members.

13. The suspension system of claim 12 wherein each of the threaded fasteners extends through an opening defined by a substantially flat surface of an associated one of the upwardly extending arms.

14. The suspension system of claim 13 wherein each of the substantially flat surfaces extends in a common plane that extends substantially perpendicular to the elongate members.

15. The suspension system of claim 9 wherein expansible plug members close rearwardly opening end regions of the tubular elongate members.

16. The suspension system of claim 9 wherein each of the elongate arms is configured to position the front wheel axle a short distance forwardly of the front ends of the elongate members, and to give the vehicle a relatively short positive trail measurement.

* * * * *